United States Patent [19]
Held et al.

[11] Patent Number: 5,699,518
[45] Date of Patent: Dec. 16, 1997

[54] SYSTEM FOR SELECTIVELY SETTING A SERVER NODE, EVALUATING TO DETERMINE SERVER NODE FOR EXECUTING SERVER CODE, AND DOWNLOADING SERVER CODE PRIOR TO EXECUTING IF NECESSARY

[75] Inventors: Andrew G. Held, Kirkland; Edward Jung, Seattle; Mark Zbikowski, Woodinville, all of Wash.

[73] Assignee: Microsoft Corporation, Redmond, Wash.

[21] Appl. No.: 158,631

[22] Filed: Nov. 29, 1993

[51] Int. Cl.$^6$ .............................. G06F 13/00; G06F 15/76
[52] U.S. Cl. .................... 395/200.11; 395/335; 395/653
[58] Field of Search .................................. 395/200, 575, 395/650, 200.11, 335, 653

[56] References Cited

U.S. PATENT DOCUMENTS

| | | | |
|---|---|---|---|
| 4,887,204 | 12/1989 | Johnson et al. | 364/200 |
| 5,157,390 | 10/1992 | Yoshie et al. | 340/825.52 |
| 5,167,035 | 11/1992 | Mann et al. | 395/575 |
| 5,287,537 | 2/1994 | Newmark et al. | 395/800 |
| 5,325,527 | 6/1994 | Cwikowski et al. | 395/650 |
| 5,329,619 | 7/1994 | Pagé et al. | 395/200 |
| 5,341,477 | 8/1994 | Pitkin et al. | 395/200 |
| 5,390,297 | 2/1995 | Barber et al. | 395/200 |
| 5,430,876 | 7/1995 | Schreiber et al. | 395/650 |
| 5,440,744 | 8/1995 | Jacobson et al. | 395/650 |

OTHER PUBLICATIONS

"OS/2 Multiple Specification Within Path and File Name", IBM TDB n5 10-91 p223 Order 91A 62640, Oct. 1991.
"The Annotated C++ Reference Manual", Ellis et al, ANSI Base Document, 1990.
Microsoft LAN Version 2.0 User's Guide for MS OS/2, Microsoft Corporation 1990 pp. 45, 140-141.
"The Design and Implementation of a Reliable Distributed Operating System—ROSE", Ng, IEEE, pp. 2-11, Apr. 1990.

(List continued on next page.)

*Primary Examiner*—Thomas C. Lee
*Assistant Examiner*—Rehana Perveen
*Attorney, Agent, or Firm*—Seed and Berry LLP

[57] ABSTRACT

A method and system for executing code remotely is provided. In a preferred embodiment, a client program executes on a client node and communicates with a network. The executing client program then requests the execution of server code corresponding to an object instance or object class instance with which the client program desires to communicate. In response to the client program request, the computer system determines a location where the server code will be executed. This determination is made using a set of rules that arbitrate between location contexts specified by the corresponding server program and a location context requested by the client program. Once the appropriate location is determined, the client program forwards its request to the appropriate network node, which requests execution of the requested server code.

34 Claims, 17 Drawing Sheets

OTHER PUBLICATIONS

"A service Platform for Distributed Applications", Popescu–Zeletin et al, IEEE, pp. 11–17, Jul. 1992.

Microsoft Windows Version 3.1 Programmer's Reference vol. 1: Overview, Microsoft Corporation 1992, pp. 210–212, 232.

Microsoft Windows Version 3.1 Programmer's Reference vol. 2: Functions, Microsoft Corporation 1992, pp. 672–683, 685–686, 688–689, 695–698, 712–713, 722.

Microsoft LAN Manager Version 2.0 Administrator's Guide, Microsoft Corporation 1990, pp. 235–245.

Vinoski, Steve, "Distributed Object Computing with CORBA", *C++ Report* 5:32–38, Jul.–Aug. 1993.

"Efficient Message Dispatching in Distributed Environments", *IBM Technical Disclosure Bulletin* 35:437–438, 1992.

Mowbray, T.J. et al., "Interoperability and CORBA–based Open Systems", *Object Magazine* 3:1055–3614, Sep.–Oct. 1993.

Arnold, J. et al., "Control Integration and Its Role in Software Integration", *Genie Logiciel & Systemes Experts* 30:14–24, Mar. 1993.

Tanenbaum, A.S. et al., "The Amoeba Distributed Operating System—A Status Report", *Computer Communications* 14:324–335, 1991.

Varadharajan, V. et al., "Multilevel Security in a Distributed Object–Oriented System", *Computers & Security* 10:51–68, 1991.

Determining Code Location Based on Location Context

| | 1 | 2 | 3 | 4 | 5 |
|---|---|---|---|---|---|
| 1 | CoGetClassObject | | | | |
| 2 | | Class supports: | | | |
| 3 | | IN_PROC | LOCAL_SERVER | Named Node | AT_BITS |
| 4 | Client requests nothing | | | | |
| 5 | | | | | FAIL |
| 6 | | | | runs at client | |
| 7 | | OK | | | |
| 8 | | | OK | | |
| 9 | | | | runs at client | |
| 10 | | OK | OK | | |
| 11 | | OK | | | |
| 12 | | OK | | | |
| 13 | | OK | OK | | |
| 14 | | | | | |
| 15 | | | | OK | |
| 16 | | OK | | | |
| 17 | | OK | | | |
| 18 | | OK | | | |
| 19 | | OK | | | |

*FIG. 5-1*

Determining Code Location Based on Location Context

| CoGetClassObject | | | | |
|---|---|---|---|---|
| | Class supports: | | | |
| Client requests IN_PROC | IN_PROC | LOCAL_SERVER | Named Node | AT_BITS |
| | | | | FAIL |
| | OK | | runs at client | |
| | | OK | | |
| | OK | OK | runs at client | |
| | OK | | | |
| | OK | OK | | |
| | OK | OK | | |
| | OK | | | |

*FIG. 5-2*

Determining Code Location Based on Location Context

| CoGetClassObject | | | | |
|---|---|---|---|---|
| | Class supports: | | | |
| Client requests LOCAL_SERVER (or named node if node == client) | IN_PROC | LOCAL_SERVER | Named Node | AT_BITS |
| | | | | FAIL |
| | OK | OK | runs at client | |
| | | | | |
| | OK | OK | runs at client | |
| | | OK | | |
| | | OK | runs at client | |
| | | OK | | |
| | | OK | | |
| | | OK | runs at client | |
| | | OK | | |

FIG. 5-3

Determining Code Location Based on Location Context

| CoGetClassObject | | | | |
|---|---|---|---|---|
| | Class supports: | | | |
| | IN_PROC | LOCAL_SERVER | Named Node | AT_BITS |
| Client requests named node (assumes node != client node) | | | | |
| | | | | FAIL |
| | FAIL | FAIL | OK | |
| | | | | FAIL |
| | FAIL | FAIL | OK | FAIL |
| | | | OK | |
| | FAIL | FAIL | OK | FAIL |
| | | | OK | |
| | | FAIL | OK | |
| | | | OK | |
| | FAIL | FAIL | OK | |
| | | | | |

FIG. 5-4

Determining Code Location Based on Location Context

| CoGetClassObject | | | | |
|---|---|---|---|---|
| | Class supports: | | | |
| | IN_PROC | LOCAL_SERVER | Named Node | AT_BITS |
| Client requests AT_BITS | FAIL | FAIL | FAIL | FAIL |

*FIG. 5-5*

Determining Code Location Based on Location Context

| CoGetPersistentInstance and CoNewPersistentInstance | | | | |
|---|---|---|---|---|
| | Class supports: | | | |
| | IN_PROC | LOCAL_SERVER | Named Node | AT_BITS |
| Client requests nothing | | | runs at client | OK |
| | OK | OK | | |
| | | OK | runs at client | |
| | OK | OK | | |
| | OK | | | |
| | OK | | | |
| | OK | OK | | |
| | OK | | | |
| | OK | | | |

*FIG. 5-6*

Determining Code Location Based on Location Context

| CoGetPersistentInstance and CoNewPersistentInstance | | | | |
|---|---|---|---|---|
| | Class supports: | | | |
| | IN_PROC | LOCAL_SERVER | Named Node | AT_BITS |
| Client requests IN_PROC | | | | FAIL |
| | OK | OK | runs at client | |
| | | OK | | |
| | OK | OK | runs at client | |
| | OK | | | |
| | OK | OK | | |
| | OK | | | |
| | OK | | | |

*FIG. 5-7*

Determining Code Location Based on Location Context

| CoGetPersistentInstance and CoNewPersistentInstance | | | | |
|---|---|---|---|---|
| | Class supports: | | | |
| | IN_PROC | LOCAL_SERVER | Named Node | AT_BITS |
| Client requests LOCAL_SERVER (or named node if node == client) | | | | FAIL |
| | OK | OK | runs at client | |
| | OK | OK | | |
| | | OK | runs at client | |
| | | OK | | |
| | | OK | runs at client | |
| | | OK | | |
| | | OK | runs at client | |

*FIG. 5-8*

Determining Code Location Based on Location Context

| CoGetPersistentInstance and CoNewPersistentInstance | | | | |
|---|---|---|---|---|
| | Class supports: | | | |
| | IN_PROC | LOCAL_SERVER | Named Node | AT_BITS |
| Client requests named node (assumes node != client node) | | | | FAIL |
| | FAIL | FAIL | OK | |
| | FAIL | FAIL | OK | FAIL |
| | FAIL | FAIL | OK | FAIL |
| | | | OK | |
| | | | OK | |
| | FAIL | FAIL | OK | FAIL |
| | | | OK | |

FIG. 5-9

Determining Code Location Based on Location Context

| CoGetPersistentInstance and CoNewPersistentInstance | | Class supports: | | | |
|---|---|---|---|---|---|
| | | IN_PROC | LOCAL_SERVER | Named Node | AT_BITS |
| Client requests named node (if bits are at named node) | | | | OK | OK |
| | | FAIL | FAIL | | |
| | | | FAIL | OK | |
| | | FAIL | | | OK |
| | | FAIL | | OK | OK |
| | | | FAIL | OK | |
| | | | | OK | OK |
| | | | | OK | |
| | | FAIL | FAIL | OK | |

*FIG. 5-10*

Determining Code Location Based on Location Context

| CoGetPersistentInstance and CoNewPersistentInstance | Class supports: | | | |
|---|---|---|---|---|
| | IN_PROC | LOCAL_SERVER | Named Node | AT_BITS |
| Client requests AT_BITS (assumes bits not at client node) | FAIL | OK | runs at bits | OK |
| | | | | OK |
| | | | | OK |
| | | | | OK |
| | | | | OK |
| | | OK | runs at bits | OK |
| | | | runs at bits | |
| | | | runs at bits | |

FIG. 5-11

SYSTEM FOR SELECTIVELY SETTING A SERVER NODE, EVALUATING TO DETERMINE SERVER NODE FOR EXECUTING SERVER CODE, AND DOWNLOADING SERVER CODE PRIOR TO EXECUTING IF NECESSARY

TECHNICAL FIELD

This invention relates generally to a computer method and system of executing code remotely on a computer network, and more specifically, to a method and system for executing code remotely without preconfiguring the network and without client knowledge of specific location.

BACKGROUND OF THE INVENTION

Within a computer network environment, the location where program code is executed becomes increasingly important. If code is executed on the same node where the data manipulated by the code is stored, then the code executes more efficiently. In prior systems, when a client program desires to execute a server program on a particular network node, several techniques can be used. In one technique, a system administrator starts the server program executing on the desired network node. In another technique, a system administrator or the client program remotely sends a network message to the desired node to begin executing the server program. In another technique, a daemon process is started on the desired network node with an identified message address. Later, when a client program directly or indirectly sends a message to the message address, the server program is actually executed. The message acts like a trigger. With these prior techniques, some program or user on the network knows in advance where a server program can be executed and how to begin executing the server program.

The present invention is described below using object-oriented programming techniques. Thus, a quick overview of well-known object-oriented programming techniques is provided. Two characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{ public:
    int x, y;
    int radius;
    void draw( );
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b. The following statements assign data to the data members of objects a and b.

a.x=2;
a.y=2;
a.radius=1;
b.x=4;
b.y=5;
b.radius=2;

The following statements are used to draw the circles defined by objects a and b.

a.draw();
b.draw();

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{ public:
    int pattern;
    void fill( );
};
```

This declaration specifies that class CIRCLE_FILL includes all the data and function members that are in class CIRCLE in addition to those data and function members introduced in the declaration of class CIRCLE_FILL, that is, data member pattern and function member fill. In this example, class CIRCLE_FILL has data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL ). A class that does not inherit the characteristics of another class is a primary (root) class (e.g., CIRCLE). A class whose characteristics are inherited by another class is a base class (e.g., CIRCLE is a base class of CIRCLE_FILL ). A derived class may inherit the characteristics of several classes, that is, a derived class may have several base classes. This is referred to as multiple inheritance.

A class may specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{ public:
    int x, y;
    int radius;
    virtual void draw( );
};
```

```
class CIRCLE_FILL : CIRCLE
{ public:
    int pattern;
    virtual void draw( );
};
```

If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked.

In order to access objects, the C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.

CIRCLE *c_ptr;

c_ptr =&c;

Continuing with the example, the following statement declares object a to be of type class CIRCLE and object b to be of type class CIRCLE_FILL.

CIRCLE a;

CIRCLE_FILL b;

The following statement refers to the function draw as defined in class CIRCLE.

a.draw();

Whereas, the following statement refers to the function draw defined in class CIRCLE_FILL.

b.draw();

FIG. 1 is a block diagram illustrating typical data structures used to represent an object. An object is composed of instance data (data members) and member functions, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to the model defined in U.S. patent application Ser. No. 07/682,537, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that objects can be defined using other programming languages.

An advantage of using object-oriented techniques is that these techniques can be used to facilitate the sharing of data and code. In particular, object-oriented techniques facilitate the creation of compound documents. A compound document is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow the embedding of a spreadsheet object, the word processing program needs to be compiled with the class definition of the spreadsheet object to enable the word processing program to invoke function members of the spreadsheet object. To allow objects of an arbitrary class to be embedded into compound documents, interfaces are defined through which an object can be accessed without the need for the word processing program to have access to the class definitions at compile time. An abstract class is a class in which there is at least one virtual function member with no implementation (a pure virtual function member). An interface is an abstract class with no data members and whose virtual functions are all pure. Thus, an interface provides a protocol for two programs to communicate. Interfaces are typically used for derivation: a program implements classes that provide implementations for the interfaces the classes are derived from. Thereafter, objects are created as instances of these derived classes.

The following class definition is an example definition of an interface. In this example, for simplicity of explanation, rather than allowing any class of object to be embedded in its documents, a word processing program allows spreadsheet objects to be embedded. Any spreadsheet object that provides this interface can be embedded, regardless of how the object is implemented. Moreover, any spreadsheet object, whether implemented before or after the word processing program is compiled, can be embedded.

```
class     ISpreadSheet
{         virtual void File( ) = 0;
          virtual void Edit( ) = 0;
          virtual void Formula( ) = 0;
          virtual void Format( ) = 0;
          virtual void GetCell (string RC, cell *pCell) = 0;
          virtual void Data( ) = 0;
}
```

The developer of a spreadsheet program would need to provide an implementation of this interface to allow the spreadsheet objects to be embedded in a word processing document. Typically, the developer would provide a class definition, derived from this interface, that includes code for each function defined by the interface.

When the word processing program embeds a spreadsheet object, the program needs access to the class code that implements the interface (the function members) for the spreadsheet object. To access the class code, each implementation is given a unique class identifier. For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed instances of the developer's spreadsheet objects into a word processing document. The word processing program accesses the function members of the embedded spreadsheet objects without regard to who has implemented them or how they have been implemented.

SUMMARY OF THE INVENTION

It is a goal of the present invention to provide a method and system for executing code remotely on a computer network.

It is another goal of the present invention to provide a method and system for executing code remotely without preconfiguration of the network and without a client program or user knowing information regarding the location of server code or persistent object data.

It is another goal of the present invention to provide a method and system for specifying different location contexts, including both local and remote contexts, for executing server code.

It is another goal of the present invention to provide a method and system for executing server code on the server node where the persistent data bits for a specified object instance are stored.

It is another goal of the present invention to provide a method and system for determining where to execute server code after a client application requests access to a particular object.

It is another goal of the present invention to provide a method and system for arbitrating between the location context specified by the server program and a desired location context requested by the client program.

It is another goal of the present invention to provide a method and system for specifying a desired security context for executing the server code.

It is another goal of the present invention to provide a method and system for specifying whether server code is to run in the same security context as the client program or in a specified security context.

These and other goals, which will be apparent as the invention is more fully described fully below, are provided by a method and system for executing code remotely. In a preferred embodiment, a client program requests access to an object instance or a class instance. A client service control manager then determines where to execute the server code corresponding to the requested object, and either forwards this request to another network node, or executes the server code locally. The client service control manager determines where to start the appropriate server code based upon server program provided location context specifications and any location context requested by the client program request. In the case where the determined location is remote, a server service control manager receives the request forwarded by the client service control manager and then starts the execution of the server code, if it is not running already. The server code then finds or creates the object or class instance requested by the client program. The server code then marshals an interface of the requested object and sends the marshaled interface back to the server service control manager. The server service control manager then forwards this marshaled object back to the client program through the client service control manager.

BRIEF DESCRIPTION OF THE DRAWINGS

FIGS. 5-1 through 5-11 are tables defining the rules for combining the location context information specified in the persistent registry with a location context requested by a client program.

FIG. 6 is a flow diagram of the communication path for accessing a particular instance of an existing object.

FIG. 7 is a flow diagram of the communication path for creating an instance of an object and then accessing the created object instance.

DETAILED DESCRIPTION OF THE INVENTION

Figure 1:
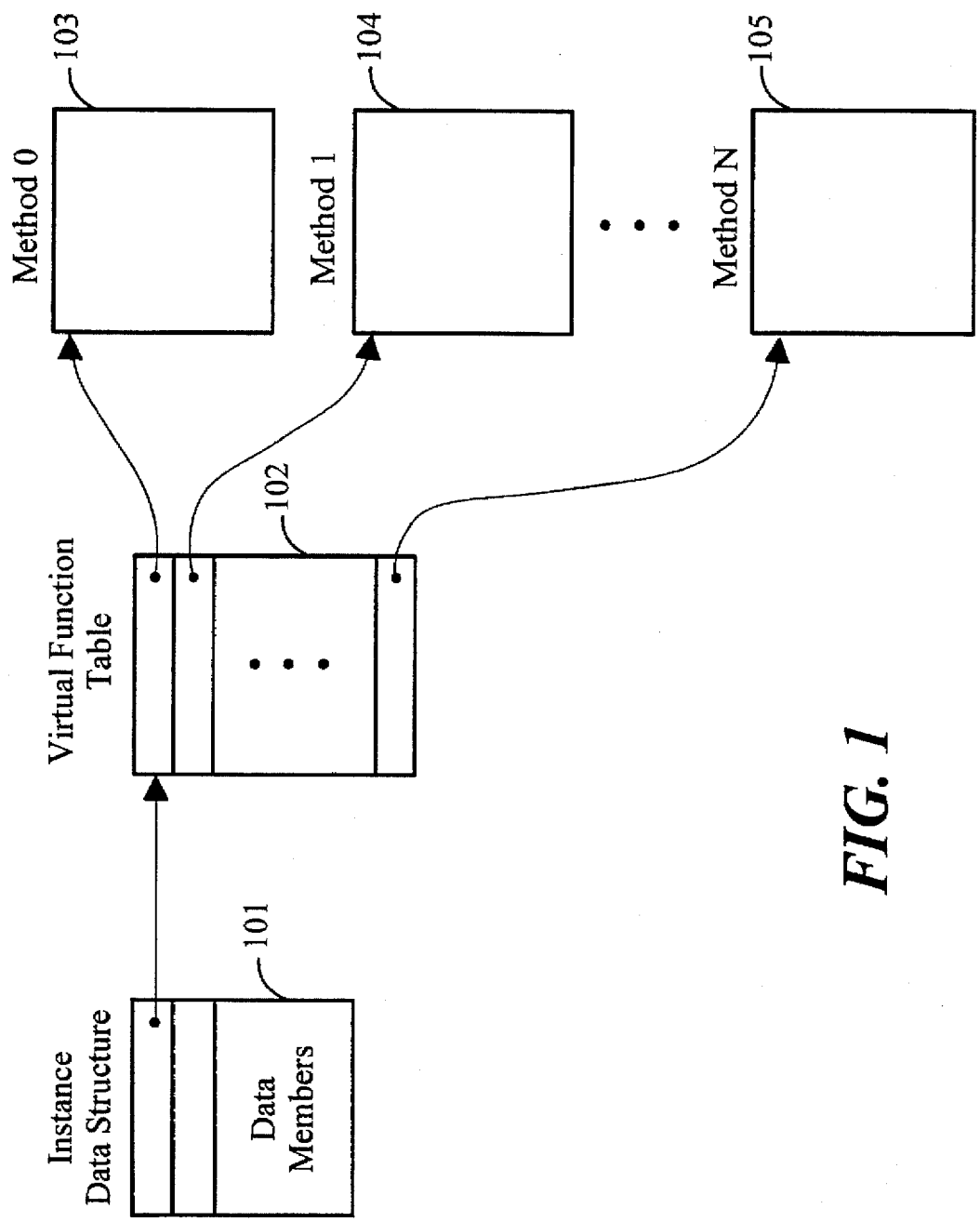
FIG. 1 is a block diagram illustrating typical data structures used to represent an object.

The present invention provides a method in a computer system for remotely executing server code at a particular location. A server program provides server code for managing objects that correspond to a particular class identifier (the server code implements the behavior for a class of objects). The server code implements one or more interfaces. In a system where portions of an implementation are shared by multiple clients, a client program requests services from the server program to help implement the behavior of the client program. In a typical object-oriented environment, a server program is invoked by the client program to manage objects that are external to those the client program implements.

In the case of a compound document system, the client program implements the compound document and the server program provides server code to manage embedded (or linked) objects stored within the compound document. Referring to the example described in the Background section, the word processing program is the client program, which provides support for the compound document. The embedded spreadsheet object is supported and manipulated by the spreadsheet program, which is the server program.

A server program may provide code implementing a particular class identifier in several forms, including a dynamic link library ("DLL") or independently executable code (e.g., an .EXE file). One skilled in the art will recognize that this code could take other forms as well. For this reason, the code provided to support a class of objects is referred to as server code and not as a server program.

The present invention allows client programs and network services (code supporting and maintaining access to network capabilities) to delay the decision of where to execute server code until the time the client program actually makes a request to access an object. No a priori configuration knowledge needs to be incorporated into the client program, the server code, or a network service responsible for locating server code. Specifically, when a client program makes a request to access an object (thereby generating a request to execute the server code associated with a particular object), a network service determines at that time a location at which to execute the server code. To determine the location, the network service combines a location context that the server program class code has specified in a persistent registry with a location context that the client program requested in its request to access an object, according to a system detined algorithm. A location context is a generic description of the location where the server code is to execute. It is used to determine what server code to execute in a particular scenario. The server program can specify location contexts for executing server code in different scenarios including executing server code at a node with a particular name, at the node where the client program is executing, or at the node where the persistent storage of the object data is located. Analogous to the server program specification, the client program can request the server code to be executed in a particular scenario. For example, the server program may only specify a location context for executing server code at a particular named node and the client program may request a location context for executing the server code at the node where the client program is executing. The network service then determines the node at which to execute the server code and what server code to execute based on the specified location context and the requested location context.

In addition to the location of server code, a server program can specify in the persistent registry that it wants the server code to be run in a particular security context. A security context is used by the computer system to ensure that only certain code can access data, code, and system resources that require a defined level of authorization before access is permitted. If the code to be executed has a security context with the proper authorization specified, then access to protected data, code, and resources is permitted. A security context specification is typically operating system dependent. For example, a security context can be viewed as a user account (user ID) and a password. There are many ways to implement the specification of a security context. In one embodiment, the server code specifies user IDs in a persistent registry and corresponding passwords in a secure database. When a network service or client program executes server code, it uses the information in the persistent registry and secure database to execute the server code in a particular security context.

In a preferred embodiment, the methods and systems of the present invention are implemented on a computer system comprising a central processing unit, memory, and input/output devices. In such an embodiment, a server program specifies in the persistent registry information relating to the execution of server code. In addition to specifying at least one network path for finding the server code, the server program specifies location contexts in the persistent registry. Specifically, server programs may specify one or more location contexts for executing server code: (1) at the node where the client program is executing using in-process server code (an AT_CLIENT_DLL location context), (2) at the node where the client program is executing using independently executable server code (an AT_CLIENT executable location context), (3) at the node where the persistent storage of the object data is located (an AT_BITS location context), and (4) at a node with a particular name (an AT_NAMED_NODE location context). First, corresponding to the AT_CLIENT_DLL location context, a server program may specify the location of server code in the form of a DLL. In this location context, when a client program requests in-process execution of the server code, the DLL is loaded in the process space of the client program. Second, corresponding to the AT_CLIENT executable location context, a server program may specify the location of independently executable code for running the server code locally on the same network node as the client program. Third, corresponding to the AT_BITS location context, a server program may specify the location of independently executable code for executing the server code remotely on the same network node as the persistent object data to be accessed. Fourth, corresponding to the AT_NAMED_NODE location context, a server program may specify the location of independently executable code for executing the server code remotely on a network node named by the client. The AT_CLIENT_DLL and the AT_CLIENT location contexts are referred to as local location contexts because they specify execution on the same node as the client node. The AT_BITS and the AT_NAMED_NODE location contexts are referred to as remote location contexts. Also, instead of a single AT_NAMED_NODE location context, in an alternate embodiment, a server program may specify a separate location context for each named node (or some combination thereof). For example, a server program may specify in one location context the location of server code specifically oriented towards particular hardware known to exist on a particular node.

The client program, analogous to the server program, indicates in a request to access an object how it prefers to access the object. That is, the client program specifies whether it prefers to run the server code AT_CLIENT_DLL, AT_CLIENT, AT_BITS, or at a specific named node. Unlike the server program, when requesting the named node location context, the client program specifies the specific name of a node and not the generic AT_NAMED_NODE indicator. The network services code that is responsible for determining where the server code is to execute arbitrates between what the server program has specified in the persistent registry and what the client program has requested.

In a preferred embodiment, a server program can also specify in the persistent registry a desired security context for its code. The server program specifies the security context in an operating system dependent manner, as described above, typically consisting of a user ID and a password. The server program specifies in the persistent registry whether it prefers to execute as the client program user ID or as a specific user ID. In addition, the server program registers in a secure database passwords for the user IDs (security contexts) that it desires to use. When a network service (or the client program) starts the execution of the server code, the server code is executed in the security context specified in the persistent registry. If the server program has specified an "as client" security context, then the network service impersonates the client program using well-known techniques. One such technique involves requesting a remote procedure call server (which has the capability to set the account information for any program) to impersonate the client program (set its account information to the client program account information) and then run the server code. Or, the network service can start a new user process with its account information set to the client program account information and then request the new process to begin executing the server code. If, on the other hand, the server program has specified a preference to run as a specific user ID, then the network service obtains the corresponding password from the secure database and starts the execution of the server code using this information. A client program, to insure it is communicating with the desired server code, can request a trusted program or process to execute the server code in the security context specified by the server program. Such a mechanism insures that the client program is communicating with a legitimate version of the server code.

Figure 2:
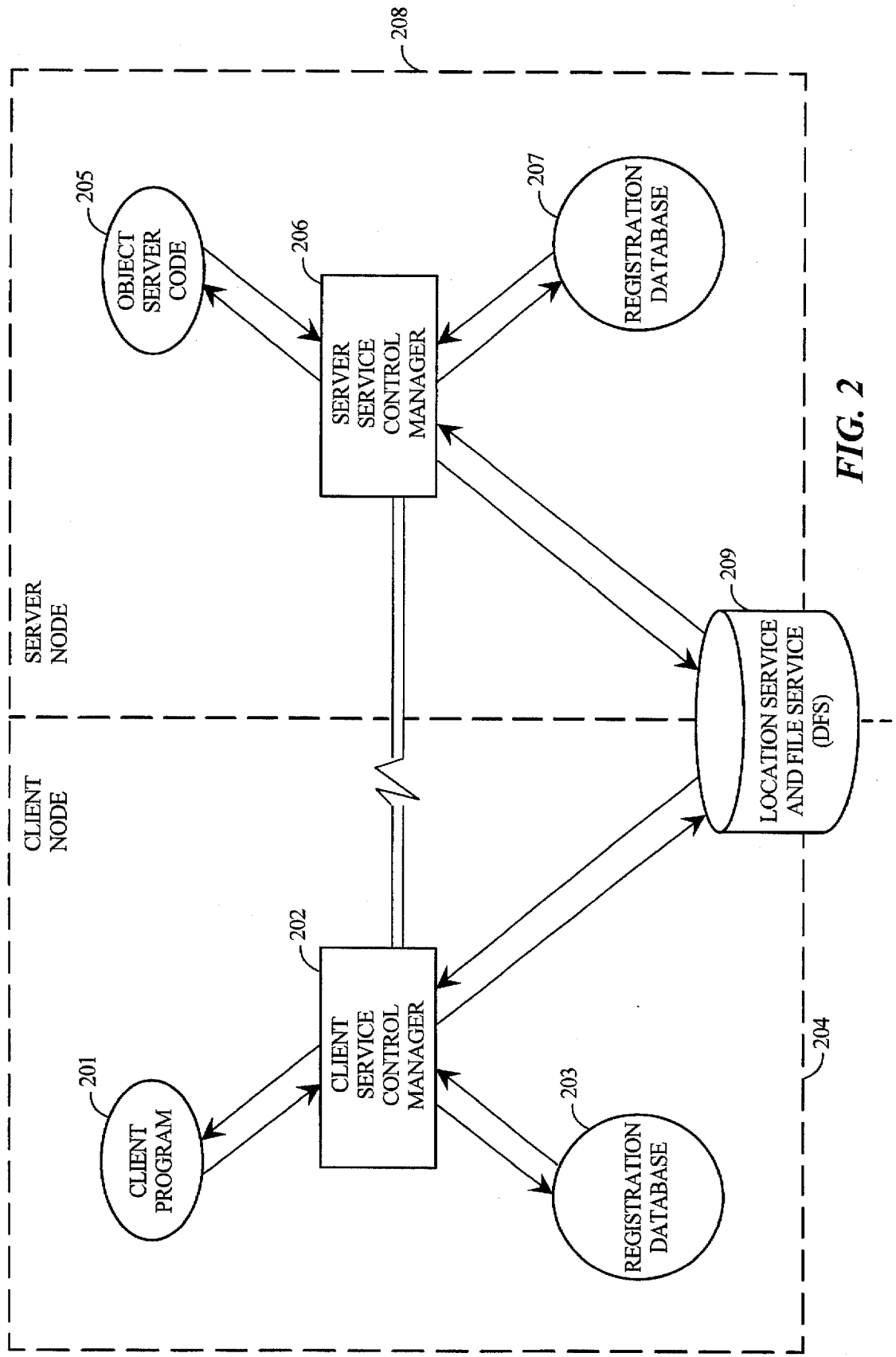
FIG. 2 is a block diagram illustrating an overview of the object activation architecture.

FIG. 2 is a block diagram illustrating an overview of a client node and a server node used to access an object. The client node 204 includes a client program 201, a client service control manager 202, and a registration database 203. The server node 208 includes a server service control manager 206, a registration database 207, and server code 205. In addition, the computer system includes network file services for accessing files and location services for determining the network address of specified code or data or the network address of a named node. In a preferred embodiment, these services are provided by a distributed file system ("DFS") 209. One skilled in the art would recognize that there are other ways to provide such services (e.g., a centralized file system server).

In summary, to access either a new object or an already existing object in a preferred embodiment, the client program 201 sends a client program activation request to the client service control manager 202 to activate an object corresponding to a particular class identifier. The client service control manager 202 is a separate process started on the client node whenever its services are needed. Thus, the client program 201 communicates with the client service control manager 202 through local remote procedure call ("RPC") mechanisms. (A "local" RPC call refers to the calling of a procedure on the same node but in a different process.) When required, the client service control manager 202 looks up information in the registration database 203 to determine a desired location context for executing the server code corresponding to the activation request. Also, when required, the client service control manager 202 asks the DFS 209 to return a server node network address for given a network path name. Once the client service control manager 202 knows with which network node to communicate, the client service control manager 202 establishes a remote connection, using standard RPC mechanisms, to the server service control manager 206 on the determined node corresponding to the client program activation request. (If the client service control manager 202 determines that the object server code 205 needs to execute locally, then the client service control manager 202 communicates directly with the object server code 205 using local RPC mechanisms.) In its communication, the client service control manager 202 forwards all of the information in the client program activation request to the server service control manager 206. The server service control manager 206 then consults the registration database (and possibly the DFS 209) to find the proper object server code 205. The server service control manager 206 then starts up the object server code 205, if necessary. The object server code 205 then performs whatever tasks necessary to activate a new or already existing object instance. Finally, the object server code 205 marshals a pointer to the object instance data structure into a packet and sends the packet to the client program 201 through the server service control manager 206 and the client service control manager 202. The client program 201 unmarshals the pointer and is then able to communicate with the object server code directly.

Marshalling and unmarshalling are mechanisms for passing pointers to objects between processes. They are defined in a U.S. patent application Ser. No. 08/158,627 entitled "A METHOD AND SYSTEM FOR NETWORK MARSHALLING OF INTERFACE POINTERS FOR REMOTE PROCEDURE CALLS," which is being filed concurrently and which is hereby incorporated by reference. Basically, an application uses marshalling to package a pointer to an interface into a packet that can be sent across processes. The packet includes information identifying the server node and process for response communication (callback capability). When a pointer is marshalled, a stub object is created in the server process. The stub object knows how to invoke the actual function members of the object server code. When a client process receives a marshalled interface pointer, it unmarshals the pointer and creates an interface proxy object in its own address space. The proxy object contains function entry points for all of the function members of the interface, but each function implementation simply forwards the call to the stub object. The marshalling process creates the proxy and the stub objects and connects them for future communication.

Accessing a Class Instance

Figure 3:
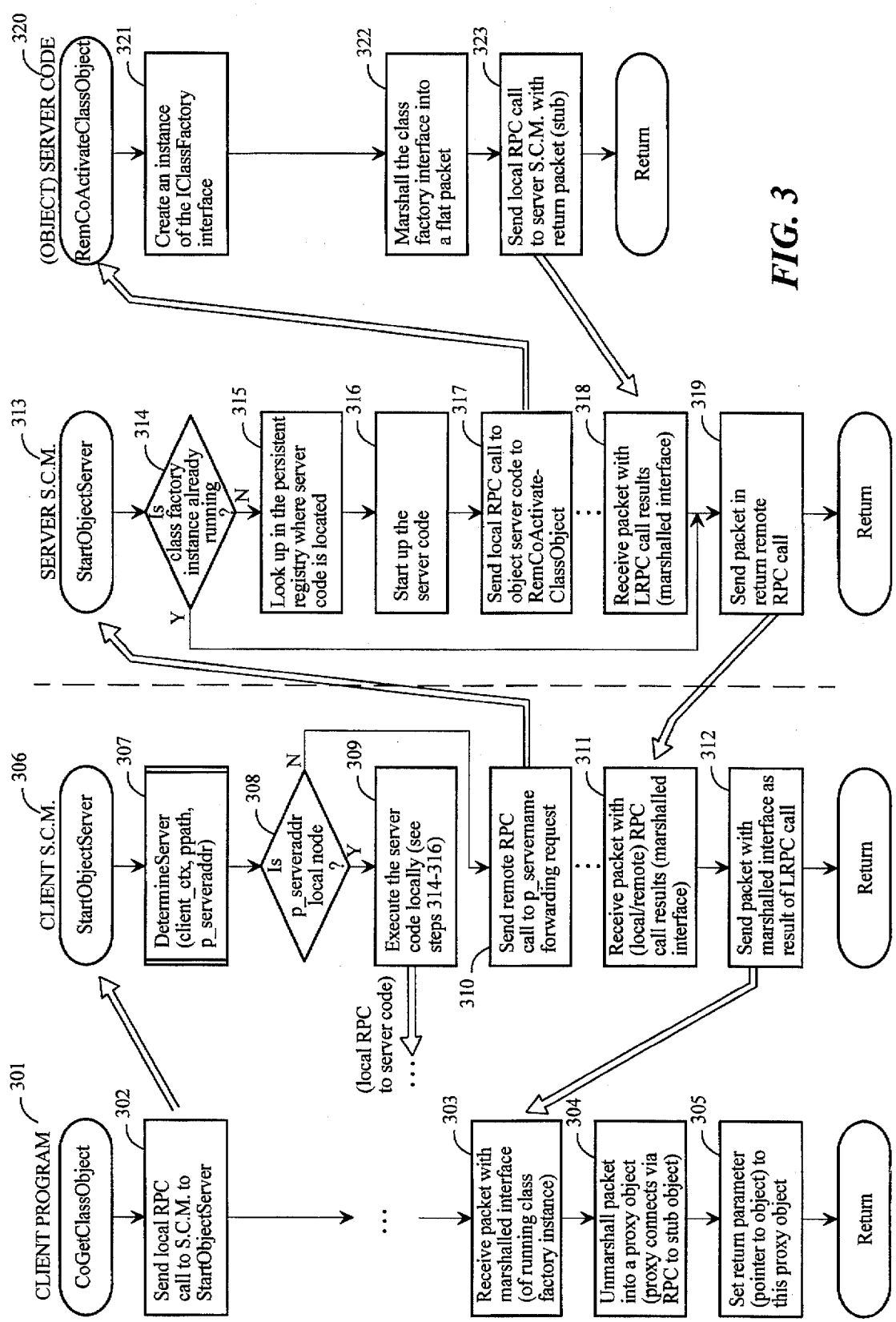
FIG. 3 is a flow diagram of the communication path for accessing a class instance.

FIG. 3 is a flow diagram of the communication path for accessing a class instance. A class instance can be used by a client program in any manner. As a typical example, a client program uses the class instance to create another instance of that class (an object) using the IClassFactory interface. The IClassFactory interface provides a function member, CreateInstance for creating objects of that class. All such objects have the same class identifier and thus share the same class (object server) code. The class code provides the implementation for function members to manipulate object data, as discussed in the Background section.

FIG. 3 shows the communication between four different processes: a client program 301, a client service control manager 306 (labeled Client SCM), a server service control manager 313 (labeled Server SCM), and object server code 320. The dashed line in the figure indicates node boundaries. The client program 301 and the client service control manager 306 reside on the client node, and the server service control manager 313 and the object server code 319 reside on the server node. As described with reference to FIG. 2, the client program requests activation of a class object from the client service control manager 306, and the client service control manager 306 forwards the request onto the proper server service control manager 313, after determining with which server service control manager to communicate. The server service control manager 313 then starts executing the requested object server code. The object server code 320 then creates an instance of the IClassFactory interface for the requested object and returns this interface through the two service control managers to the client program 301.

This description assumes the determined server service control manager resides on a remote server node. If, on the other hand, the client service control manager 306 determines that the object server code 320 should execute on the same node as the client program 301, then the client service control manager 306 need not forward the client program request. One skilled in the art would appreciate that the local execution of the object server code is analogous to the remote execution and is thus not discussed in detail.

In step 302, the client program 301 sends a request to the client service control manager 306 via a local RPC mechanism to invoke the function StartObjectServer. Upon receiving this RPC request, the client service control manager 306 invokes the function StartObjectServer to determine where to execute the server code and sends the appropriate request to the determined server. In step 307, the function StartObjectServer calls the function DetermineServer to determine the desired server node based upon both the server code location context specification in the persistent registry and a client requested location context, if one is indicated in the client program request. (This function is discussed in detail with reference to FIG. 4.) In step 308, the function determines whether the determined server node is the same as the local node (where the client program 301 is executing), and if so, continues at step 309, else continues at step 310. In step 309, the function executes analogous steps to 314 through 316 to start up the object server code locally. In step 309, the function ultimately executes a local RPC call to the object server code executing locally. The object server code executing locally eventually sends a local RPC call to the client service control manager 306 and execution continues in step 311. In step 310, the function sends a request to invoke the StartObjectServer function on the determined server node using a remote RPC mechanism. The function StartObjectServer forwards the client program request to the appropriate server service control manager. Upon receiving the request to invoke the StartObjectServer function, the server service control manager 313 on the determined server node invokes the StartObjectServer function. In step 314, the function StartObjectServer determines whether there is an instance of the IClassFactory interface for the requested class identifier already running, and if so, continues at step 319, else continues at step 315. (Each time the object server code is executed, the object server code creates and registers an instance of the IClassFactory interface for each of the classes of objects it is capable of creating and managing.) The function StartObjectServer assumes that if there is an instance of this interface registered it is in a marshaled form. The function StartObjectServer then retrieves this marshaled interface and continues in step 319 to send the marshaled interface. In step 315, the function StartObjectServer looks up in the persistent registry information corresponding to the current location context for identifying the object server code to execute. In one embodiment, this information is a specific path name pointing to a DLL or independently executable code. This function consults the DFS if necessary to actually obtain the object server code. In step 316, the function StartObjectServer causes the object server code 320 to execute. In step 317, this function sends a request to the object server code 320 to invoke the RemCoActivateClassObject function using a local RPC mechanism. Upon receipt of the request, the object server code 320 invokes the function RemCoActivateClassObject, which creates an instance of the IClassFactory interface and returns a marshaled version of this interface to the server service control manager 313. In step 321, the function RemCoActivateClassObject creates an instance of the IClassFactory interface for the requested class identifier. In step 322, this function marshals this IClassFactory interface instance into a packet. In step 323, the function RemCoActivateClassObject returns this packet to the server service control manager 3 13 through the local RPC mechanism. In turn, the function StartObjectServer, executed by the server service control manager 313, receives the marshaled IClassFactory interface instance in step 318, and in step 319 forwards the packet to the client service control manager 306. The function StartObjectServer executed by the client service control manager 306 then receives the marshaled packet in step 311 (either from remote or local server code). In step 312, the function StartObjectServer then sends the packet containing the marshaled IClassFactory interface instance to the client program 301 through the local RPC mechanism. When the client program 301 receives this packet in step 303 of the function CoGetClassObject, it unmarshals the packet into a proxy object in step 304. This proxy object implements the IClassFactory interface for the requested class identifier and, through the unmarshalling function call, the proxy object is connected to the stub object corresponding to the same IClassFactory interface on the server node. In step 305, the function CoGetClassObject sets the return parameter designated to contain a pointer to an activated class object to this proxy object and returns.

Figure 4:
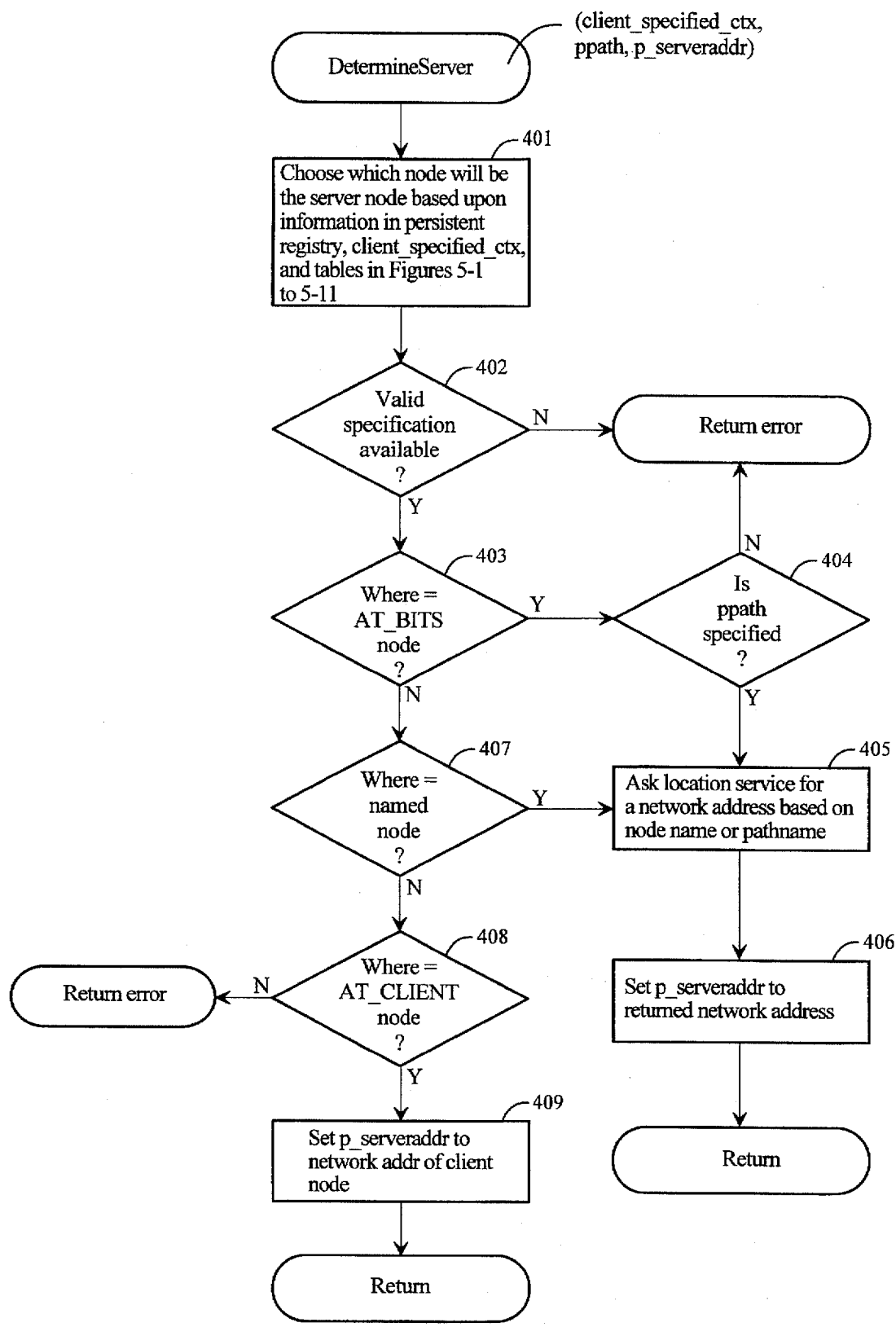
FIG. 4 is a flow diagram of the function DetermineServer for determining a location for executing the server code.

FIG. 4 is a flow diagram of the function DetermineServer for determining a location for executing the object server code. This function is invoked by the client service control manager 306 (in FIG. 3) to return a server node network address appropriate to the client program activation request. Once the server node address is received, the client service control manager 306 forwards the client program activation request to the server service control manager 313 on the determined server node. The function DetermineServer chooses a server node for executing the requested server code based upon the location context specifications provided by the server program in the persistent registry in combination with a location context requested by the client program. The function chooses a server node based upon the tables discussed below with reference to FIGS. 5-1 through 5-11. The function has two input parameters and one output parameter. The parameter client_specified_ctx contains a client specified location context if one was indicated in the original client program activation request. The values for this parameter include AT_BITS, AT_CLIENT_DLL, AT_CLIENT, or the name of a particular server node. The second input parameter is ppath, which is the network path name to object instance data if this path can be derived from the original client program activation request. The output parameter p_serveraddr is a pointer to the network address of a server node.

The function DetermineServer chooses a server node using one set of rules for combining the location context information in the persistent registry with the client_specified_ctx parameter. These rules are discussed in greater detail below with reference to FIGS. 5-1 through 5-11. One skilled in the art will recognize that many alternative rules for combining location contexts are possible. Also, different location contexts other than AT_BITS, AT_CLIENT_DLL, AT_CLIENT, and AT_NAMED_NODE could be defined. The tables in FIGS. 5-1 through 5-11 indicate which server node to use based upon the particular activation request invoked, the location context requested by the client program, and the location contexts specified by the server program. As illustrated, the tables also incorporate four general rules for determining what server code to execute. First, if an AT_BITS location context has been specified by the server program, then the server code corresponding to this location context is preferably only executed where the object instance data (the bits) are located. Second, if the client program requests a remote location context (such as AT_BITS or at a particular named node) and the server program has only specified a local location context (such as AT_CLIENT or AT_CLIENT_DLL), then the local location context specification is preferably not used for remote execution because the corresponding server code may not be able to execute remotely: local code is preferably only executed locally. Third, if the client program requests a local location context (such as AT_CLIENT or AT_CLIENT_DLL), then a local location context is preferably used if one has been specified by the server program. Otherwise, if a local location context is not specified, an AT_NAMED_NODE remote location context is preferably used if one has been specified by the server program, but the corresponding server code is executed locally. (Note that an AT_BITS location context is preferably not used for local execution unless the first rule is satisfied.) Fourth, if the client program does not request a location context and the server program has specified only one location context, then this location context is preferably used, subject to the first rule regarding the AT_BITS location context. If the server program has specified multiple location contexts, then the tables shown in FIGS. 5-1 through 5-11 indicate which location context to use.

In step 401, the function DetermineServer chooses a server node based upon the location context specifications in the persistent registry, the client_specified_ctx location context requested (if one exists), and the rule tables defined in FIGS. 5-1 through 5-11. In step 402, the function determines whether a valid location context was derived using the rule tables and, if so, continues at step 403, else returns an error. In step 403, the function determines whether the server node corresponding to the AT_BITS location context has been chosen and, if so, continues at step 404, else continues at step 407. In step 404, the function determines whether ppath has been specified, which indicates a network path name to the requested object instance data. If so, the function continues at step 405, else returns an error. In step 405, the function asks the location service (DFS) for the network address of the chosen server node based upon either a node name or a path name. In this case, the function asks for the network address based upon ppath. In step 406, the function sets the return parameter p_serveraddr to the network address returned by the location service. In step 407, the function determines whether the server node corresponding to the AT_NAMED_NODE location context has been chosen and, if so, continues at step 405 using the client requested node name, else continues at step 408. In step 408, the function determines whether the server node corresponding to the AT_CLIENT or AT_CLIENT_DLL location context has been chosen and, if so, continues at step 409, else returns an error. In step 409, the function sets the return parameter p_serveraddr to the network address of the client node and returns.

FIGS. 5-1 through 5-11 are tables defining the rules for combining the location context information specified in the persistent registry with a location context requested by a client program. Each table defines a generic node location where server code is preferably executed and which server code to execute, given a particular client program activation request and a particular set of location contexts specified by a server program. The generic node locations correspond to execution at the node where the client program is executing, at the node named by the client program activation request, or at the node where the persistent data for the requested object is stored. Each table is comprised of five columns and multiple rows. The first column indicates the particular client program activation request and a client program requested location context, if one exists. The remaining columns describe what server code to execute at which node for every possible combination of location context specifications. There are fifteen possible combinations of location contexts specifiable by a server program in the present embodiment. Each row indicates one possible combination of specified location contexts. There is a separate column for each location context that can be specified by a server program. Each cell corresponding to a single row and a single column indicates whether the server program has specified the location context information for the corresponding column. In the tables shown, the second column corresponds to the AT_CLIENT_DLL location context (labeled as IN_PROC), the third column corresponds to the AT_CLIENT location context for independently executable code (labeled as LOCAL_SERVER), the fourth column corresponds to the AT_NAMED_NODE location context (labeled as Named Node), and the fifth column corresponds to the AT_BITS location context (labeled as AT_BITS). For a given combination of location contexts specified in the persistent registry (each row), if a cell is defined and indicates that the corresponding location context information is preferably used to find the server code, then the generic node location corresponding to that location context is chosen as the server node. For a given combination, only one cell is defined and indicates that its corresponding location context is preferably used. A cell is defined if it is shown in white. A cell is undefined if it is shown in grey. A cell indicates that its corresponding location context is preferably used if there is text shown in the cell indicating "OK" or other text indicating that the corresponding location context can be used (e.g., "runs at client"). If, on the other hand, the text in the cell indicates "FAIL", the corresponding location context is preferably not used for that particular combination of location context specifications and that particular client request.

For example, the table in FIG. 5-1 defines which location context to use (thus, which server node to use) when the client program activation request is CoGetClassObject and the client program does not request a location context in the activation request. The fifteen rules corresponding to all possible combinations of location context specifications in the persistent registry are shown in rows 5 through 19, columns 2 through 5. Rows 5 through 8 illustrate cases where the server program has specified only one location context. In row 5, the server program has only specified a location context for AT_BITS. In this case, a request to choose a server node using this table will fail because, according to the general rules discussed earlier, an AT_BITS specification is preferably only used for executing server code at the node where the object instance data is stored; in the case of CoGetClassObject request, there is yet no object instance data. In row 6, the server program has only specified a location context for AT_NAMED_NODE. In this case, the client node is chosen as the server node, and the server code location information corresponding to the AT_NAMED_NODE location context identifies the server code to execute at the client node. In row 7, the server program has only specified a location context for the AT_CLIENT (executable) location context. In this case, the client node is chosen as the server node, and the server code location information corresponding to the AT_CLIENT location context identifies the server code to execute on the client node. In row 8, the server program has only specified a location context for the AT_CLIENT_DLL location context. In this case, the client node is chosen as the server node, and the server code location information corresponding to the AT_CLIENT_DLL location context identifies the server code to execute on the client node. Similarly, rows 9 through 19 illustrate cases where the server program has defined two or more location contexts in the persistent registry. In each row, there is one cell that is preferably chosen as the proper location context to use. In all cases for this client program activation request (CoGetClassObject), with the exception of row 5, the client node is chosen as the server node. Where text indicates, the corresponding location context information is used to identify the server code that will execute at the client node.

Analogous to FIG. 5-1, FIGS. 5-2 through 5-5 are tables that define rules corresponding to the CoGetClassObject activation request when the client has requested an AT_CLIENT_DLL location context, an AT_CLIENT location context, a named node location context, and an AT_BITS location context, respectively. Also, analogous to FIG. 5-1, FIGS. 5-6 through 5-11 are tables that define rules corresponding to a CoGetPersistentInstance or CoNewPersistentInstance activation request when the client has requested no location context, an AT_CLIENT_DLL location context, an AT_CLIENT location context, a named node location context, a named node location context when the node is also the node where the object instance persistent data is stored (the AT_BITS node), and an AT_BITS location context, respectively.

Accessing an Existing Object Instance

Figure 6:
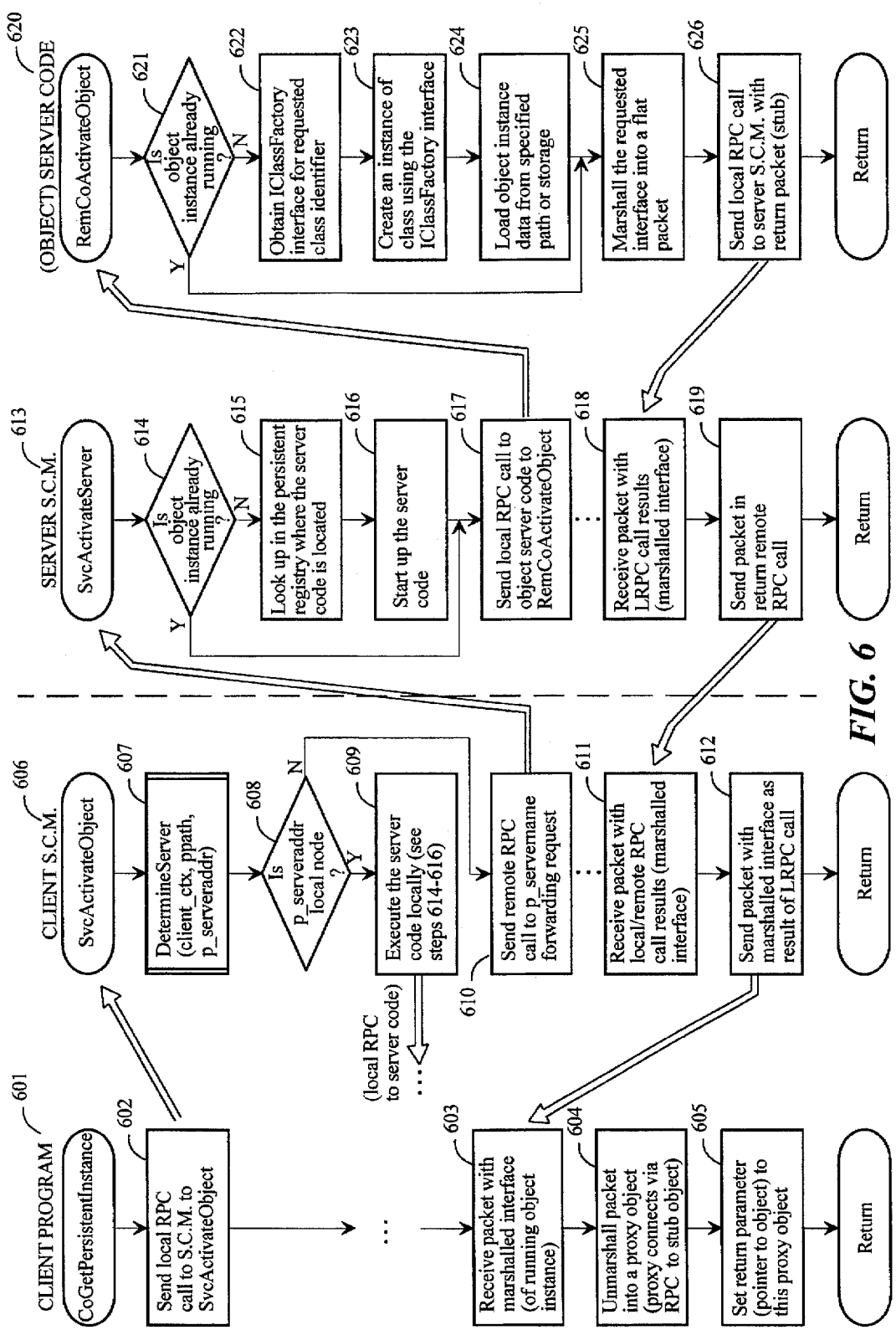

FIG. 6 is a flow diagram of the communication path for accessing a particular instance of an existing object. This communication path is a typical path encountered when a client program attempts to bind to (activate and access) an already existing object. In a preferred embodiment, the client program 601 specifies in the bind request a path name or a pointer to a storage object where the object instance data is stored. This bind request results in the invocation of the system provided function, CoGetPersistentInstance. The communication path shown in FIG. 6 is fundamentally the same as the communication path described with reference to FIG. 3, except that different functions are invoked and the object server code 620 performs slightly different tasks. Also the object server code 620 returns the requested interface instance in a marshaled form instead of returning an IClassFactory interface instance in a marshaled form.

Specifically, the following steps are different from FIG. 3. In step 602, the client program 601 requests invocation of the function SvcActivateObject in the client service control manager 606. The function SvcActivateObject executed by the client service control manager 606 performs analogous steps to StartObjectServer. However, the SvcActivateObject function executed by the server service control manager 613 performs slightly different tasks then StartObjectServer. As a preliminary step, the function determines in step 614 whether or not the requested object instance is already executing on the server node. In a preferred embodiment, the function makes this determination by looking at a running object table, which contains references to all of the objects currently executing on the server machine. If the function determines that the object (the object server code 620) is executing, then the function skips the step of starting the object server code and continues at step 617. Otherwise, the function continues in steps 615 and 616, performing the same tasks as those described with reference to FIG. 3, except that the function invokes a different entry point, RemCoActivateObject, in the object server code 620.

The function RemCoActivateObject performs similar tasks to the RemCoActivateClassObject function discussed with reference to FIG. 3, except that it returns the requested interface of an existing object instance instead of the IClassFactory interface for the class. In step 621, if the object is already executing (which implies its instance data has already been loaded), then the function continues at step 625, else it continues at step 622. In step 622, the function finds the IClassFactory interface corresponding to the requested class identifier. In step 623, the function creates an instance of the requested object using this IClassFactory interface. In step 624, the function loads the object instance data from the path or storage object specified in the client program request. In step 625, the function marshals the requested interface into a packet. In step 626, the function then returns this packet to the server service control manager 613, which packet is then forwarded on to the client program 601, as described with reference to FIG. 3.

Creating and Accessing an Object Instance

Figure 7:
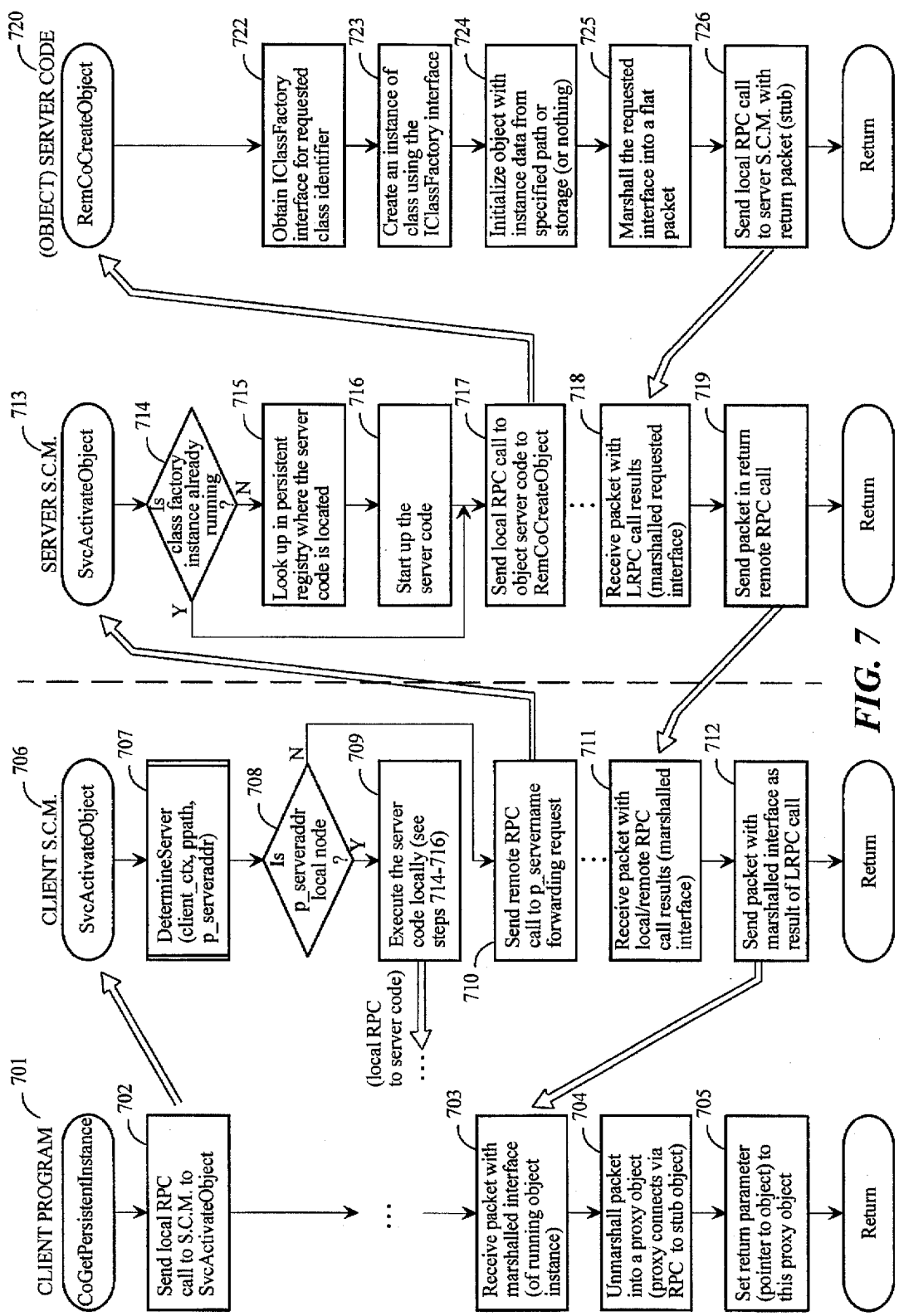

FIG. 7 is a flow diagram of the communication path for creating an instance of an object and then accessing the created object instance. The communication path shown in FIG. 7 is fundamentally the same as that discussed with reference to FIG. 6, except that different client program and object server code functions are invoked. Also, neither the server service control manager 713 nor the object server code 720 check for an existing instance corresponding to the requested object, because the communication path shown in FIG. 7 assumes that a new instance is created for each client program request. As in FIG. 3, however, the SvcActivateObject checks for an executing instance of the IClassFactory interface that corresponds to the requested class identifier to avoid starting the server code unnecessarily. Another minor difference occurs in step 724 where the object is initialized with data (if it is provided) instead of loading the data. The step numbers labeled in FIG. 7 correspond directly to the analogous step numbers in FIG. 6.

Invoking Server Code in a Particular Security Context

When the client program requests access to a particular object or object class, as described with reference to FIGS. 3, 6, and 7, then the server service control manager (e.g., 713 in FIG. 7), or the client service control manager, if local execution is determined, needs to use the security context specified by the server program in the persistent registry when it invokes the server code in step 16 of FIGS. 3, 6, and 7. In one embodiment, the server service control manager logs on to the server node as the user ID specified in the persistent registry using the password information stored in the secure database. The server service control manager then executes the object server code in that security context. One skilled in the art would recognize that there are many ways to store the security context information and to then execute the object server code in a particular context. In an alternate embodiment, the client program duplicates its process environment (for example, using a "fork" system call in a UNIX style environment) and then executes the server code. The forked (new) process can either execute the server code directly or log on to the computer system as the appropriate user ID and then execute the server code. In another embodiment, there is a separate security context for each location context.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method in a computer system network for specifying the execution of server code on a computer system node, the network having a plurality of computer system nodes, the method comprising the steps of:

executing a client program on a client node;

requesting execution of the server code;

in response to the request to execute the server code,
retrieving a client location context indicating a server node at which the server code is preferably to be executed, the client location context being selectively set to the client node a named node or a node where the persistent data is stored;

retrieving a server location context indicating the server nodes at which the server code can be executed, the server location context being set to one or more of the client node, a named node, or a node where the persistent data is stored;

evaluating the client location context and the server location context to determine the server node where the server code will be executed as either the client node, a named node, or a node where the persistent data is stored;

downloading the server code to the determined server node when the server code is not located at the determined server node; and requesting execution of the server code on the determined server node.

2. The method of claim 1, the server code having a specified security context, and wherein the step of effecting the execution of the server code effects execution of the server code in the specified security context.

3. The method of claim 2, the computer system having a persistent registry, the method further including the step of specifying the specified security context in the persistent registry.

4. A method in a computer system network for specifying the execution of server code on a computer system node, the server code implementing behavior of an object, the network having a plurality of computer system nodes, the method comprising the steps of:

executing a client program on a client node;
under control of the client program, requesting access to the object;

in response to the request to access the object, requesting activation of the server code; and in response to the request to activate the server code, retrieving a client location context of a node at which the server code is to be executed;

retrieving a server location context of a node at which the server code can be executed;

evaluating the client location context and the server location context to determine a server node where the server code will be executed, wherein the determined server node is selectively set to one of the client node, a named node, or a node where persistent data of the object is stored; and downloading the server code to the determined server node when the server code is not located at the determined server node.

5. The method of claim 4, the client node having a client service control manager for activating the server code, wherein the step of requesting activation of the server code is performed under the control of the client program, and wherein the steps of retrieving and evaluating are performed under the control of the client service control manager.

6. The method of claim 4 including storing the server location context in a persistent registry.

7. The method of claim 4 wherein the step of requesting activation of the server code specifies the client location context.

8. The method of claim 5, the server code having a specified security context, and wherein the step of requesting activation of the server code causes execution of the server code in the specified security context.

9. The method of claim 5, the determined server node having a server service control manager for activating server code and communicating with the client service control manager, and wherein the step of requesting activation of the server code is performed under the control of the client service control manager and is requested of the server service control manager.

10. The method of claim 4, the determined server node having a server service control manager for activating server code, and wherein the step of requesting execution of the server code on the determined server node is requested of the server service control manager.

11. The method of claim 10, further including the step of, under control of the server code, specifying the server location context for executing the server code in a subsequent execution of the server code.

12. The method of claim 11 wherein the step of specifying the server location context stores the specification in a persistent registry.

13. The method of claim 10 wherein the step of requesting activation of the server code specifies a location for executing the server code.

14. The method of claim 10, the server code having a specified security context, and wherein the step of requesting activation of the server code causes execution of the server code in the specified security context.

15. The method of claim 4, the server code having a specified security context, and wherein the step of requesting execution of the server code on the determined server node causes execution of the server code in the specified security context.

16. The method of claim 15, the computer system having a persistent registry, the method further including the step of specifying the specified security context in the persistent registry.

17. A method in a computer system network for specifying the execution of server code on a computer system node, the server code implementing behavior of an object, the network having a plurality of computer system nodes, the method comprising the steps of:

executing a client program on a client node;

under control of the client program, requesting access to the object;

in response to the request to access the object, requesting activation of the server code; and in response to the request to activate the server code, retrieving a client location context of a server node at which the server code is to be executed;

evaluating the client indication to determine a node where the server code will be executed, wherein the determined node is selectively set to either the client node or a node where persistent data of the object is stored; and downloading the server code to the determined server node when the server code is not located at the determined server node.

18. The method of claim 17 wherein the server code is available as a separate executable and as a linkable library that is executable within an address space of the client program, and wherein the step of determining a node selects the client node, and further comprising the step of selecting either the separate executable or the linkable library as the server code to be activated on the client node.

19. A method in a computer system network for specifying the execution of server code on a computer system node, the server code implementing behavior of an object, the server code having a server location context that specifies a plurality of locations to execute the server code, the network having a plurality of computer system nodes, the method comprising the steps of:

executing a client program on a client node;

under control of the client program, requesting activation of the server code, the request containing a request location context that specifies a plurality of locations to execute the server code; and in response to the request to activate the server code, selectively setting a determined node to where the server code will be executed based upon evaluating the plurality of locations of both the server location context and the request location context; and downloading the server code to the determined server node when the server code is not located at the determined server node.

20. The method of claim 19 wherein the server location context is a specific name of a node or an indication of how to determine a specific name of a node.

21. The method of claim 19 wherein the server location context symbolically indicates the client node.

22. The method of claim 19 wherein the server location context symbolically indicates a node where persistent data of the object is stored.

23. The method of claim 19 wherein the request location context is a specific name of a node or an indication of how to determine a specific name of a node.

24. The method of claim 19 wherein the step of determining where the server code will be executed is performed by a service control manager.

25. The method of claim 19 wherein the server location context specifies a security context and wherein the step of requesting execution of the server code causes execution of the server code in the specified security context.

26. A computer-readable memory device containing instructions for controlling a computer processor to perform the steps of:

receiving a request from a client program on a client node to activate server code, the server code implementing behavior of an object;

retrieving persistently-stored server location context of a server node at which the server code can be executed;

determining, based upon the request and the server location context, a server node for executing the server code, the server node being selectively set to either the client node or a node where persistent data of the object is stored;

downloading the server code to the determined server node when the server code is not located at the determined server node; and returning an indication of the server node to the client program.

27. The computer-readable memory device of claim 26 containing further instructions for controlling the computer processor to perform the steps of:

determining whether a location for activating server code has been specified by the server code; and when the location has been specified by the server code, using the specified location in conjunction with the request to determine the server node.

28. A computer network system for determining the location of execution of server code on a computer system node, the system comprising:

an object with persistent data stored on a node and having server code for implementing the behavior of the object;

a client node;

a service control manger that, in response to a request to activate the server code, determines a server node for executing the server code based upon a location context, the server node being selectively set to the client node or the node that stores the persistent data of the object and downloading the server code to the determined server node when the server code is not located at the determined server node; and a client program executing on the client node that, in response to invocation, requests activation of the server code from the service control manager.

29. The computer system of claim 28 wherein the activation request specifies the location context.

30. The computer system of claim 28 wherein the server code specifies the location context.

31. The computer system of claim 28 wherein the service control manager executes on the client node.

32. The computer system of claim 31 wherein the service control manager sends a request to activate the server code to a second service control manager executing on the determined server node.

33. The computer system of claim 28 wherein the service control manager causes the server code to be executed on the determined server node.

34. The computer system of claim 28 wherein the service control manager activates the server code without executing the server code on the determined server node by instead returning a reference to an object data structure.

* * * * *

UNITED STATES PATENT AND TRADEMARK OFFICE
CERTIFICATE OF CORRECTION

PATENT NO. : 5,699,518
DATED : December 16, 1997
INVENTOR(S) : Held, et al.

It is certified that error appears in the above-identified patent and that said Letters Patent is hereby corrected as shown below:

Column 3, lines 37-38, "U.S. patent application Ser. No. 07/682,537, entitled 'A Method for Implementing Virtual Functions and Virtual Bases in a Compiler for an Object-Oriented Programming Language'" should be --U.S. Patent No. 5,297,284, entitled "Method and System for Implementing Virtual Functions and Virtual Base Classes and Setting a This Pointer for an Object-Oriented Programming Language"--.

Column 5, line 22, delete "fully" (second occurrence).

Column 9, line 33, "U.S. patent application Ser. No. 08/158,627" should be --U.S. Patent No. 5,511,197,--.

Column 9, line 61, after "CreateInstance" add --,--.

Column 10, line 6, "319" should be --320--.

Column 11, line 20, "3 13" should be --313--.

Column 14, line 61, after "Also" add --,--.

Column 15, line 5, "then" should be --than--.

UNITED STATES PATENT AND TRADEMARK OFFICE
CERTIFICATE OF CORRECTION

PATENT NO. : 5,699,518
DATED : December 16, 1997
INVENTOR(S) : Held, et al.

It is certified that error appears in the above-identified patent and that said Letters Patent is hereby corrected as shown below:

Column 15, lines 50-51, "the SvcActivateObject" should be --the function SvcActivateObject--.

In the Claims:

Claim 1, column 16, line 35, after "node" (first occurrence) add --,--; after "node" (second occurrence) add --,--.

Claim 26, column 19, line 4, after "retrieving" insert --a--.

Signed and Sealed this

Eighteenth Day of July, 2000

Attest:

Q. TODD DICKINSON

*Attesting Officer*         *Director of Patents and Trademarks*